Feb. 19, 1924. 1,484,116
C. DRESSLER
METHOD OF AND APPARATUS FOR GLAZING AND DECORATING
Original Filed May 17, 1920
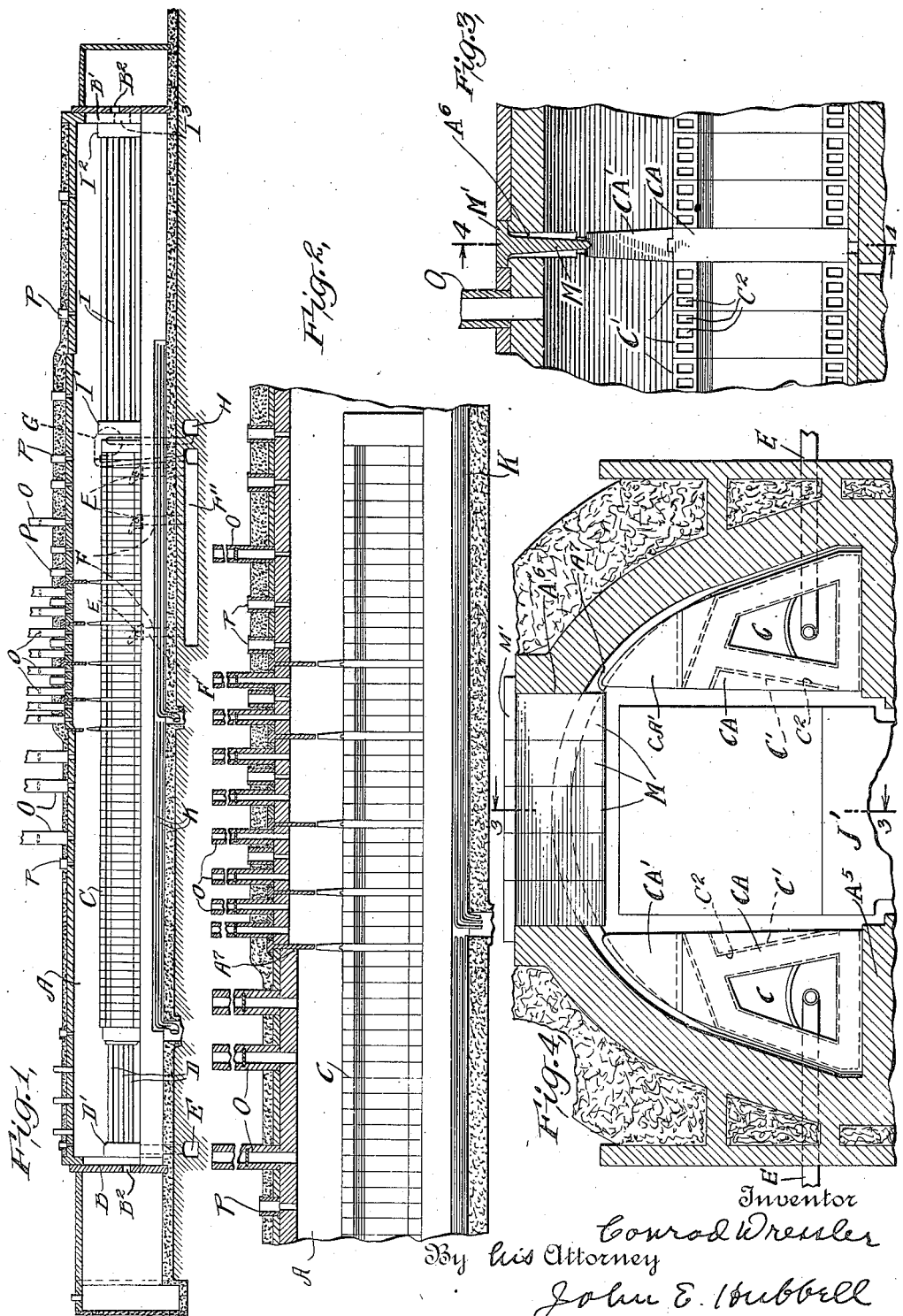
Inventor
Conrod Dressler
By his Attorney
John E. Hubbell Patented Feb. 19, 1924.

1,484,116

UNITED STATES PATENT OFFICE.

CONRAD DRESSLER, OF CLEVELAND, OHIO, ASSIGNOR TO AMERICAN DRESSLER TUNNEL KILNS, INC., OF NEW YORK, N. Y., A CORPORATION OF NEW YORK.

METHOD OF AND APPARATUS FOR GLAZING AND DECORATING.

Application filed May 17, 1920, Serial No. 382,001. Renewed July 17, 1923.

*To all whom it may concern:*

Be it known that I, CONRAD DRESSLER, a subject of the King of Great Britain, and resident of Cleveland, in the county of Cuyahoga and State of Ohio, have invented certain new and useful Improvements in Methods of and Apparatus for Glazing and Decorating, of which the following is a specification.

My present invention consists in improvements in kiln construction and operation especially devised for the firing and glazing in a continuous tunnel kiln of ceramic ware from which gases or vapors are distilled, either from the body of the ware or from the glaze forming coating applied to the latter, when the ware is fired up, and which gases and vapors have a detrimental effect upon the flow and setting of the glaze formed, if permitted to remain in contact with the ware in the further heating of the latter.

My invention may be advantageously employed, for example, in the manufacture of terra cotta when made, as is common in some localities, from a shale clay containing sulphur and shale oil, and in the manufacture of decorated china. When terra cotta is made from a clay containing sulphur and shale oil, the sulphur and shale oil are distilled and burned out of the ware during an initial stage of the firing operation, and the ware must be protected against exposure to an atmosphere containing the sulphur and carbonaceous vapors thus driven out of the ware during the final stages of the glaze firing operation because of the detrimental effect of such an atmosphere on the formation of the glaze. In the manufacture of decorated china or earthen ware the over glaze coloring or decoration applied to the ware when the latter is in the glazed form, generally contains a substance or substances vaporized during an initial stage in the over glaze firing operation and which, if present in the atmosphere to which the ware is exposed in the subsequent stages of the glaze firing operation, will have a detrimental effect upon the glaze formation. This is true, for example, where liquid or other gold is applied to the ware in the form of a gold sulphur emulsion, and is the case also where metallic oxides are employed to color the china and are applied to the glost ware by means of a tacky vehicle such as the ordinary resin containing vehicles commonly employed.

In proceeding in accordance with the invention, the glazing operation is performed in a continuous tunnel kiln through which the ware is passed and in which it is gradually heated up to the temperatures at which the glaze is formed and sets, the ware being ordinarily cooled down to permit its safe exposure to atmospheric temperatures in a final ware cooling zone of the kiln. While my invention in its broader aspects may be carried out in various forms of continuous tunnel kilns I preferably employ a muffle heated kiln, and particularly a muffle heated kiln of the internal combustion chamber type disclosed in my prior Patents 1023628 and 1170428. In this internal combustion chamber type of kiln the transfer of heat from the combustion chambers to the ware is wholly or mainly by a convection current circulation of the kiln atmosphere.

With whatever type of tunnel kiln I may employ, I provide outlets through the wall of the kiln chamber for the removal of the vapors driven out of the ware and which would injuriously affect the ware if in contact with the latter during the final stages of the glazing operation. These outlets open from the zone of the chamber in which the vapors or gases to be removed are generated. When carrying out my invention with the preferred internal combustion chamber type of kiln referred to above, I so regulate the pressure conditions within the kiln chamber and at the vapor outlets that while there may be a gentle inflow of air into the distillation zone from the kiln chamber zones at each end of the distillation zone, the consequent longitudinal flow through the kiln will not be of a character to materially interfere with the convection current circulation transverse to the length of the kiln, by which heat is transferred from the combustion chambers to the ware. I advantageously employ also, a special arrangement of barriers in the kiln chamber to minimize longitudinal flow in the latter.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated a preferred kiln construction and preferred method of operation.

Of the drawings;

Fig. 1 is a somewhat diagrammatic sectional elevation of a kiln.

Fig. 2 is a section taken similarly to Fig. 1 but on a larger scale and showing a portion of the kiln of Fig. 1.

Fig. 3 is a partial section taken similarly to Fig. 2 but on a still larger scale.

And Fig. 4 is a section on the line 4—4 of Fig. 3.

The continuous tunnel kiln A, shown in the drawings, comprises an elongated kiln chamber in which are located combustion chambers C resting on benches $A^5$ at the opposite sides of the pathway through the kiln for the goods. The latter are moved through the kiln on the usual cars J' which enter the kiln at one end past a normally closed door B, and leave the kiln at the opposite end past the normally closed door B'. The combustion chambers C are each supplied with a gas or oil fuel and with air for its combustion at or adjacent one end of the chamber and at its opposite end each chamber is connected to a group of pipes D which form extensions of the combustion chamber running to the entrance end of the kiln where they are connected to a header D'. The headers D' have outlets connected to a tunnel or duct E running to a stack, not shown, or other suitable draft creating device for removing products of combustion. As shown, each combustion chamber is provided with three fuel inlets E and with an air inlet F adjacent each fuel inlet. The air inlets F are connected to an air supply conduit F' through which air is forced by a fan or blower G. The latter is supplied with air through a duct H connected to headers I' within the kiln chamber adjacent the forward ends of the combustion chambers. The headers I' are connected to the adjacent ends of two groups of cooling pipes I, one group on each side of the goods pathway. These pipes run to the exit end of the chamber and are there connected to headers $I^2$ receiving atmospheric air through inlets $I^3$. In so far as above described the kiln shown is a typical Dressler kiln.

The combustion chambers C are preferably formed of hollow tile sections C' having open ended circulation channels $C^2$, such as are usually employed in the Dressler kiln except for certain special sections CA. The edges of the sections CA project transversely from the combustion chambers proper. As shown a barrier port CA' is mounted on top of each section CA. Each section CA unites with a section CA of the other combustion chamber and with the corresponding barrier ports CA' and with projections M depending from the roof of the kiln to form a partition or baffle wall extending transversely across the kiln chamber and formed with an opening for the goods carrying cars and the goods carried by the latter. The clearance required for safety is provided between the pathway for the goods and the edges of these openings. The projections M are fire clay sections which project into the upper portion of the kiln chamber through kerfs $A^6$ formed in the kiln roof. The sections M are formed at their upper ends with lateral flanges M' which rest on the kiln roof at the marginal edges of the kerfs $A^6$. The kerfs $A^6$ are preferably formed in part of the expansion joint provisions in the kiln wall, the side wall portions of the expansion joints being indicated at $A^7$. The transverse baffles or partitions formed by the parts CA, CA' and M' divide the kiln chamber in which they are located into a series of gas chambers open at their side and lower edges to the goods pathway and normally communicating with one another only through the necessary clearance spaces provided between the edges of the partitions and the goods and goods carrying means. Advantageously the roof of the distillation zone of the kiln in which these chambers are located are raised to increase the volume of the vault portion of the chambers. From each of the gas chambers thus formed one or more, and as shown, two outlets O are provided. The outlets O open through the roof of the kiln chamber and as shown each comprises an external stack section and is provided with a regulating damper whereby a regulated suction may be impressed on each of the outlets O. P represents the usual openings P formed in the roof of the kiln to receive the pyrometers for measuring the temperature of the kiln at intervals along its length.

In the contemplated mode of use of the apparatus shown in the drawings, the ware to be glazed or decorated is moved slowly through the kiln chamber from its entrance to its exit end. As the ware moves through the kiln it is gradually brought up to the maximum temperature required, and is thereafter gradually cooled by its passage through the cooling zone of the kiln traversed by the heat absorbing pipes I. The partitions formed by the parts CA, CA' and M are located in the distillation zone of the kiln in which detrimental vapors and gases are driven out of the ware. These vapors are withdrawn through the corresponding outlets O. By exerting the proper suction effect on the different outlets O, the objectionable vapors may be wholly withdrawn from the zone of the kiln in which they are generated. Advantageously the suction on the outlets O is so regulated that there will be a slight tendency for air to flow through the portions of the kiln chamber at each side of the distillation zone into the latter, and restricted air inlet ports $B^2$ may be formed in the doors B and B' to supply this air. The longitudinal flow of the air through the end portion of the kiln chamber required to prevent any possible flow out of the distillation zone towards the ends of the kiln chamber is relatively insignificant in amount with the baffle arrangement disclosed, and need not interfere to any appreciable extent with the normal convection current circulation of the kiln atmosphere in any portion of the kiln chamber. If some of the outlets O are closed off entirely and the location of the open outlets is varied the same kiln may be used to treat different wares some of which give off objectionable vapors at one temperature, while others give off their objectionable vapors at other temperatures.

While in accordance with the provisions of the statutes I have illustrated and described the best form of my invention now known to me it will be apparent to those skilled in the art that changes may be made in the disclosed form of carrying out my invention without departing from the spirit of the invention as set forth in the appended claims and that certain features of my invention may sometimes be used to advantage without a corresponding use of other features.

Having now described my invention, what I claim as new and desire to secure by Letters Patent, is:

1. In the method of firing and glazing ceramic ware of such character that gases and vapors are distilled therefrom during an initial stage of the glaze firing operation which detrimentally affect the glazing operation, if allowed to contact with the ware in a subsequent stage of the glazing operation, the improvement which consists in passing the ware continuously through an elongated kiln chamber so heated that the ware is gradually raised in temperature to the final temperature desired, restricting the flow longitudinally of the kiln chamber of the gases and vapors driven out of the ware and withdrawing said gases and vapors from the kiln chamber.

2. The improvement in the method of firing and glazing ceramic ware of such character that gases or vapors are distilled therefrom during an initial stage of the glaze firing operation which detrimentally affect the glazing operation if allowed to contact with the ware in a subsequent stage of the glazing operation, the improvement which consists in passing the ware continuously through an elongated kiln chamber so heated that the ware is gradually raised in temperature to the final temperature desired, restricting the flow longitudinally of the kiln chamber of the gases and vapors driven out of the ware and sucking the said gases and vapors out of the zone of the chamber in which they are driven out of the ware.

3. In a continuous tunnel kiln comprising an elongated kiln chamber with a goods pathway therethrough and combustion chambers at the sides of the goods pathway, the improvement which consists in barriers formed in part by transverse projections from the combustion chambers dividing the interior of a portion of the kiln into a series of chambers communicating with one another only through restricted clearance spaces adjacent the pathway for the goods.

4. In a continuous tunnel kiln comprising an elongated kiln chamber with a goods pathway therethrough and combustion chambers at the sides of the goods pathway, the improvement which consists in barriers formed in part by transverse projections from the combustion chambers dividing the interior of a portion of the kiln into a series of chambers communicating with one another only through restricted clearance spaces adjacent the pathway for the goods, and outlets from said gas chambers through the kiln wall.

5. In a continuous tunnel kiln comprising an elongated kiln chamber with a goods pathway therethrough and combustion chambers within said kiln chamber at the sides of the goods pathway, the improvement which consists in a series of transverse projections from the combustion chambers and transverse depending projections from the roof of the kiln uniting to form a series of transverse partitions across the kiln chamber formed with openings, the marginal edges of which fit closely about the pathway for the goods.

6. In a continuous tunnel kiln comprising an elongated kiln chamber with a trackway therethrough for goods carrying cars and with benches at the sides of said trackway, combustion chambers mounted on said benches, transverse projections from said combustion chambers and transverse projections depending from the roof of the kiln chamber uniting with the first mentioned projections to form a series of transverse partitions across the kiln chamber, each formed with an opening for the passage of the goods and goods carrying means, and having its marginal edges in close proximity to the pathway normally filled by the goods on said goods carrying cars.

7. In a tunnel kiln the combination with the kiln chamber roof formed with a transverse slot of a series of fire clay sections extending through said slot into the kiln chamber and formed at their outer ends with lateral flanges resting on the kiln roof at the margin of said slot.

Signed at Cleveland in the county of Cuyahoga and State of Ohio this 12th day of May A. D. 1920.

CONRAD DRESSLER.